Feb. 16, 1943. B. H. MOSSINGHOFF 2,311,120
BRAKE OPERATOR
Filed Jan. 30, 1939 4 Sheets-Sheet 2
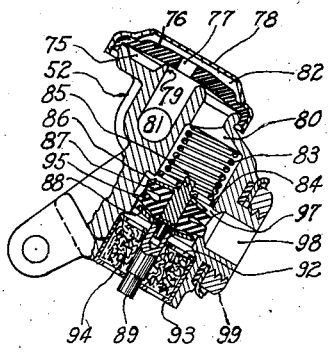
FIG. 2.
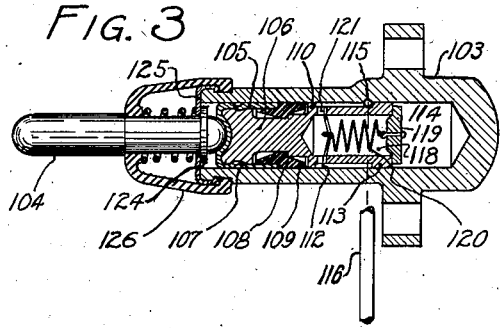
FIG. 3.
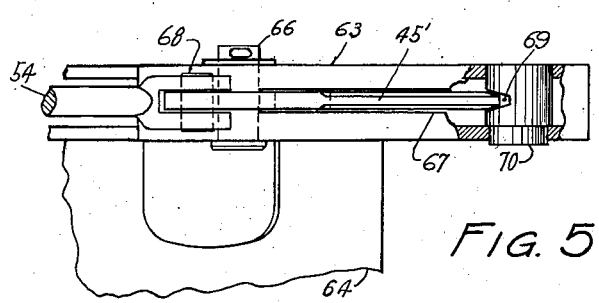
FIG. 5.
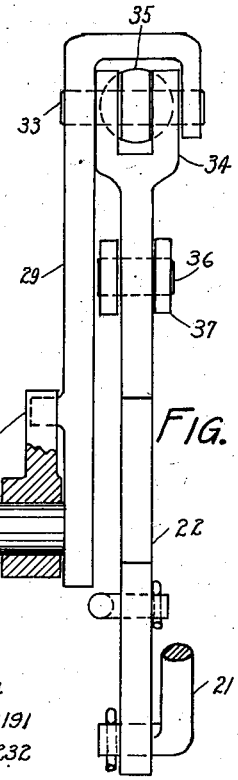
FIG. 4.
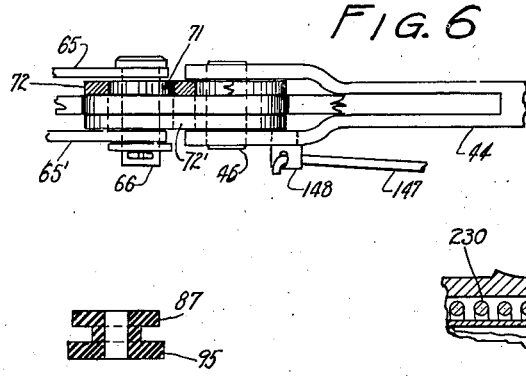
FIG. 6.
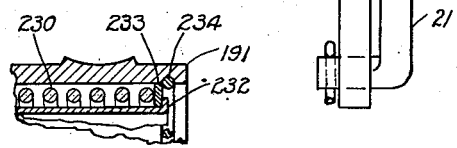
FIG. 9.
FIG. 7.
INVENTOR
Bernard H. Mossinghoff

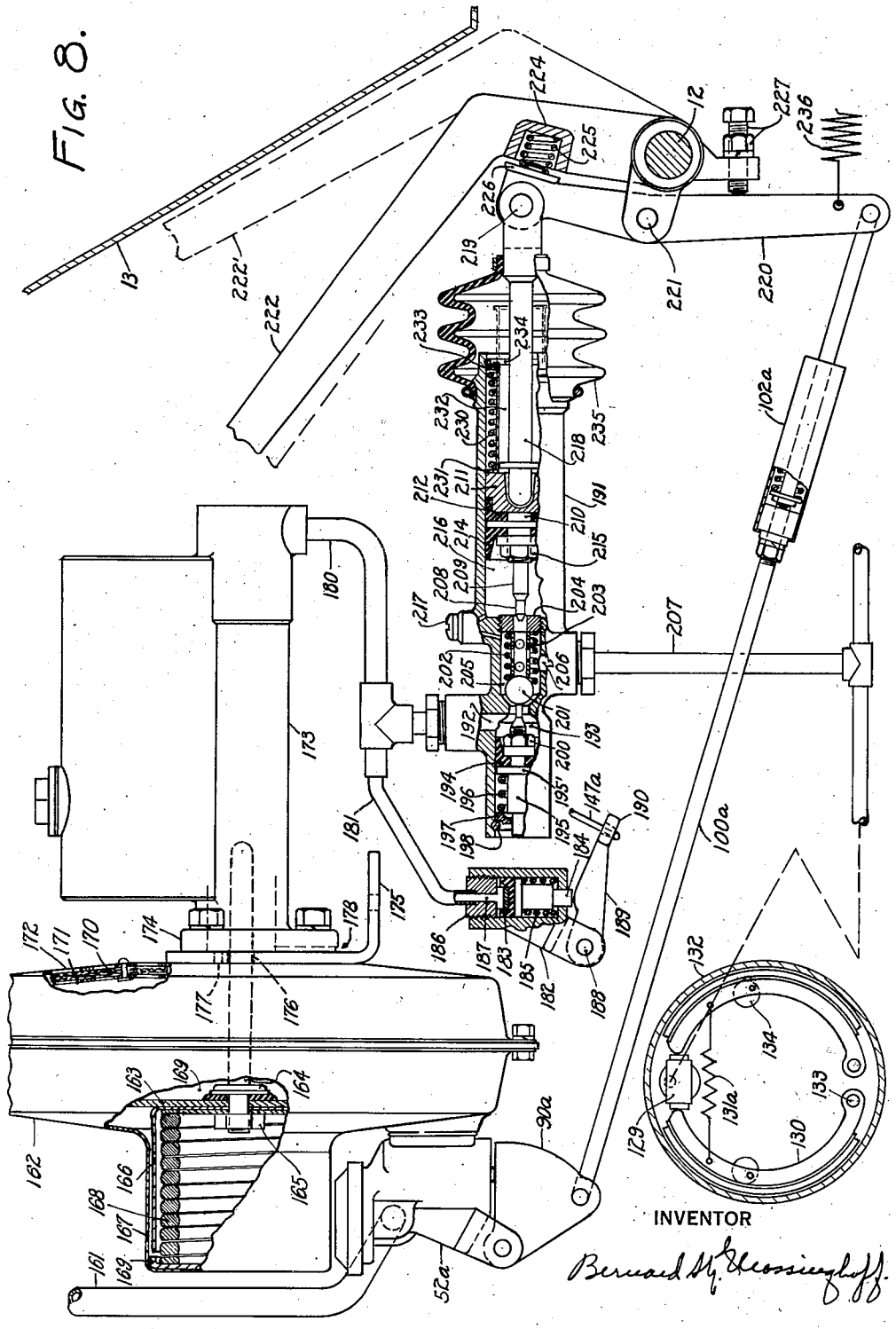

Feb. 16, 1943.   B. H. MOSSINGHOFF   2,311,120
BRAKE OPERATOR
Filed Jan. 30, 1939    4 Sheets-Sheet 4
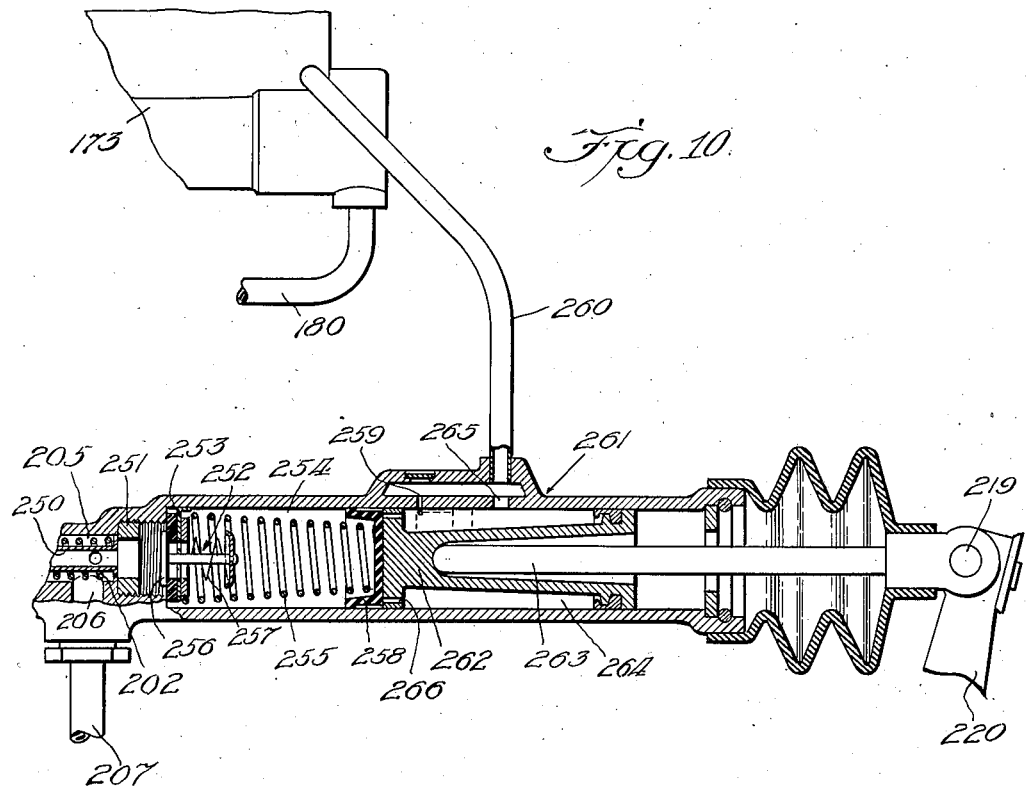
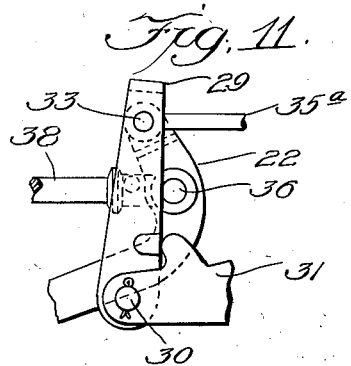
Inventor:
Bernard H. Mossinghoff Patented Feb. 16, 1943

2,311,120

UNITED STATES PATENT OFFICE 2,311,120

BRAKE OPERATOR

Bernard H. Mossinghoff, Chicago, Ill.

Application January 30, 1939, Serial No. 253,485

40 Claims. (Cl. 192—3)

My invention pertains to brake operators, with special application for vehicle brakes. In its preferred forms, disclosed herein, it is connected to operate the conventional master cylinder of the commonly called hydraulic brakes of automobiles, or to move the body of brake liquid, as disclosed in one species herein. Equivalently it may be connected to move the conventional-like common pull rod of the commonly called mechanical brakes.

Reference is made to my application Serial Number 399,908, filed June 26, 1941, for Vehicular motor and brake controls, pertaining to the accelerator disconnecting provision disclosed herein. Reference is further made to my application filed July 30, 1941, and serially numbered 404,688, also to my application filed August 16, 1941, and serially numbered 407,115, both disclosing and claiming in part promptly operable brake operators, including a brake control pedal disposed for quick foot application generally as herein disclosed, and other common matter. Reference is further made to my application filed July 4, 1942, serially numbered 449,790, for Check-valves, including the check-valve herein disclosed.

It provides a normally low-positioned brake pedal, of the heighth approximately of the customary accelerator pedal preferably. It provides further, by preference, an automatic accelerator disconnector, permitting the operating foot to largely remain thereover for depressing with about ½" (or as desired) total movement, the lightly pressured brake pedal, which is accomplished, accordingly, by short lateral displacement of the foot by heel rocking to top the brake pedal, with subsequent depression. This serves safety, by reducing the all-important time element, in view of the automobile travelling 44 feet in a second's time, at 30 M. P. H. It likewise greatly serves driver's convenience.

The direct brake actuating means, in the preferred forms, is a compression spring of the laterally restricted type, which secures safe operation even after the spring should break. To re-energize the actuating spring and to release the brakes normally, I provide a vacuum motor, of the rubber diaphragm type preferably, supplied by the engine intake manifold, as the simplest and most readily available and controllable large power source on an automobile.

The just indicated indirect power braking principle is old in the art; but in view of the supreme importance of safety for vehicle braking, I provide a novel system of force communication between the pedal and several units, whereby the pedal is returned for subsequent self-sufficient brake actuation by a long pedal stroke, if for any reason, such as failure of vacuum source, the power system might fail. I provide further by preference that the accelerator disconnector aforementioned is also operative to indicate to the driver that such power failure obtains, by the non-effectiveness of the accelerator pedal.

I further provide an ultra-safe frictional locking means of novel principles, whereby driver's foot pressure predominance over the actuating spring capacity would supplement for further pressure braking. I furthermore provide, by preference, a dash-pot device as a brake pedal retarder to assure actuation preference by the power system, during exceptional emergency conditions, which dash-pot is of novel construction, as constantly fed by the hydraulic brake lines, so as presumably never to require attention during the life of the car, which circumstance is of safety importance in brakes put into the custody of the general public.

Low pedal positioned brakes for braking promptness and driver's convenience are old in the art, such as pertain to air brakes, to car movement actuated operators, etc.; but my invention presents radical improvements in power means and wheel brake simplicity and cost, non-attention requirement, etc., as compared with air brakes; and in addition smoother and properly controllable braking, with full reaction registration against the driver's foot, without free car roll, etc., in respect to other types of low-pedal brakes, which are as a rule of considerable cost both initially and in upkeep.

The chief and important objects of my invention, accordingly, are safety for braking and convenience for the driver, as hereinabove indicated, and which respect also the relation of the driver to the car, and not solely direct operative device effects.

Not to repeat other objects indicated hereinbefore, I note briefly still further objects, as: a leverage changing feature in the interconnections; provision whereby the pedal normally serves virtually merely as a brake control, with the power virtually accomplishing the total actuation; pedal lightness attainment due to the power accomplishing virtually the whole long-stroked brake shoe setting function thus permitting leverage provision; special improved sealing control-valve structure for light pressured vacuum; provisions for proper control and feel by the foot of graduated pressure braking with braking smoothness; provision whereby the pedal is prevented from bouncing back into longer stroke upon brake release; silent device operation; provision whereby the pedal is not subject to the lost-motion implied in the above-indicated locking means; and still further objects as they become apparent in these specifications or claims, some pertaining to industrial and commercial structure feasibilities, attachability to brake systems, general simplicity as to costs, operating durability, etc.

Other objects pertain especially to the species of Fig. 8, of structures and instrumentalities to attain the general objects of this invention, with further particular objects of that species of the invention as they become apparent.

It is, of course, understood that, because of particular preferences by particular designers, such as of various automobile manufacturers, as to the variables of my invention, all of the herein enumerated or apparent objects need not be attained in the same design or to the extent disclosed, my invention embracing numerous constructions, known to me at this time, or of suitable engineering adaptations, of which the particular forms chosen as preferable in the disclosure herein, are representative.

The drawings herefor disclose two species, of Fig. 1 and Fig. 8, respectively. The devices are shown in the normal brakes-released condition, the vacuum power having been operative to position the brake pedal in its normal low position, ready for the subsequent braking operation.

Fig. 2 is a detail view in section of the combined vacuum control and check valve, mounted as a unit with the vacuum motor of Fig. 1.

Fig. 3 is a detail half-sectional view of the pedal retarding "dash-pot," shown in the extreme lower right of Fig. 1.

Fig. 4 is a relatively enlarged rear view of the floating lever and its connections, taken along line 4—4 of Fig. 1.

Fig. 5 is a plan view, partly in section, of the locking disc as mounted in the supporting bracket, and in its normal relation with its wedge-lock stud, taken along line 5—5 of Fig. 1, and with parts of the background omitted.

Figure 1:
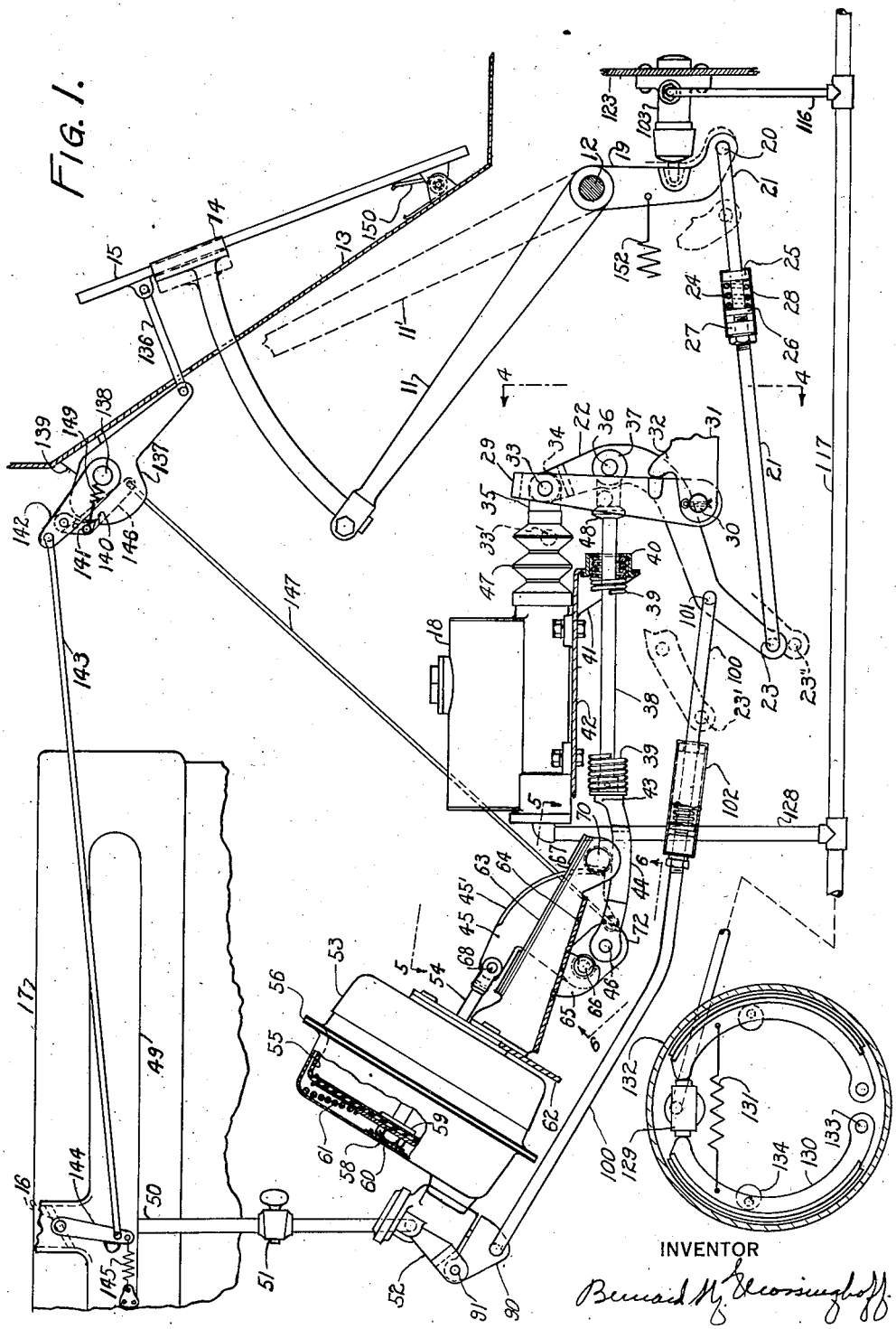
Fig. 1 is a full elevational view of one species of the invention, as positioned on an automobile, the front of the automobile being to the left of the view, the conventional toe-board being in section, and with one of the vehicle wheel brakes being represented in relatively reduced size semi-diagrammatically.

Fig. 6 presents a bottom view of the lock disc and its bearing structure, partly in section and part of the background omitted, taken along the line 6—6 of Fig. 1.

Fig. 7 is a relatively enlarged sectional view of the rubber valve part of Fig. 2, with all tensions released.

Fig. 8 presents an elevational view, partly cut away and partly in section, of another species of the invention.

Fig. 9 is an enlarged view of detail of parts in the pedal cylinder of Fig. 8 species, identifiable by identity of character numerals in Fig. 8.

Fig. 10 presents a lateral sectional view of a modified pedal cylinder, similar to that of a conventional master cylinder, to replace a corresponding portion of the Fig. 8 device.

Fig. 11 presents a lateral view of a modification to the device of Fig. 1, showing connection for actuating the so-called "mechanical brake."

Structure of the device of Figs. 1 to 7

11 designates the brake pedal rockably mounted on the fixed bearing pin 12, and having an arcuated portion projecting through the car's toeboard 13, and terminating in the foot pad 14. Pivotally mounted, as customarily, on the same toeboard is the accelerator pedal 15, connected to operate the throttle valve 16 of the engine 17. The braking system is of the commonly called hydraulic type, actuated by the conventionally standard master cylinder 18, as supplied on the automobiles produced today and as is understandable from Fig. 10; but I provide a novel linkage or interconnecting system for operation of the master cylinder piston by the brake pedal and the power actuation system.

Integral with the pedal lever 11 is its downwardly extending arm 19 at the point 20 of which is pivoted the link 21, the forward end (in respect to the automobile) of which is in turn pivoted, at point 23, to the lower extremity of the bell-crank or L-shaped floating lever 22. Inserted in the link 21 is the cushioning device comprising the compression spring 24, preferably initially tensioned and of substantial tension variation in a short stroke, bearing against the annular guide sleeve 25 slidably encompassing the rear portion of link 21, to the forward end of which is affixed the collar 26, to receive the forwardly directed tension of the spring, and abutting against the rear threaded extremity of the forward portion of the link 21, which extremity is adjustably threaded in the bushing 27, and thereto locknutted. The enclosure tube 28 is affixed onto the bushing 27 and the sleeve 25; the whole cushioning device, accordingly, permitting the link 21 to elongate with suitably graduated resistance, the elongation preferably being checked by the closure of the spring coils.

To floatingly support the bell-crank lever 22, the radius lever 29 (Fig. 4) has affixed thereto the bearing stud pin 30, for rockable mounting in the fixed journal member 31, which has an upstanding stop arm 32 cooperating with a laterally projecting lug on the radius lever, at the upper extremity of which is affixed the horizontal bearing pin 33, rockably carrying the forked extremity 34 of the lever 22, within the throat of which is also rotatably carried the end 35 of the standard conventional master cylinder piston rod, adapted to be forced into the master cylinder 18 for brake application, as conventionally. It is obvious that the customary brake pull rod 35ᵃ (Fig. 11) of the commonly called mechanical brakes may equivalently be pivoted on pin 33, for actuation of mechanical brakes.

By means of the bearing pin 36, the yoke 37 integral with the connecting rod 38 is rockably pivoted intermediately on the floating lever 22. Encompassing the said rod is the strongly initially tensioned actuating spring 39, as part of the power actuator for the brakes, which spring is of the compression type, and may be constructed of so-called flat wire, the intermediate portion of the spring being conveniently shown cut away in the drawing. The rear extremity of this compression spring bears against the formed metal cup 40, having an enlarged center orifice, through which passes the rod 38 with additional lateral displacement freedom, and has a flanged-over rim to bear against the periphery of a commensurate orifice, punched in the downwardly extending reinforcing flange 41, integral with the fixed bracket 42, fixedly supporting the master cylinder 18, and which itself is fixedly supported from the chassis side frame of the car. The actuating spring 39 is accordingly substantially concealed from view from above, though exposed to servicing inspection from below. The forward extremity of the said spring 39 forcefully bears against an annular washer surmounting the enlarged flanged end 43 of the bifurcated member 44, to which the rod 38 is firmly affixed by any suitable means, as a screw thread and anchoring cross pin, which member 44 straddles the locking disc 45, to which it is rotatably pivoted at pin 46 (Fig. 6). The actuating spring 39, accordingly, tends constantly and with substantial force to move the rod 38 and the bearing pin 36 forward, namely leftward in viewing Fig. 1, which movement, as will later more fully appear, normally causes brake application by forcing the pivot pin 33 forward for master cylinder piston operation, the rubber dust guard 47 collapsing to permit such movement. Due to the guiding function of the rod 38, any accidental breaking of the coils of the spring 39, would not fully incapacitate it from operating the brakes. The collar enlargement 48 on the rod 38 is adapted to bear against the cup 40 to facilitate removal of the heavily tensioned spring and rod unit from the assembly.

I provide power actuation, preferably vacuum fluid power as disclosed, to reenergize the actuating spring 39 and concurrently release the brakes. I furthermore provide a locking device preferably of the friction type to prevent overdominance of force from the pedal from moving the rod 38 rearward during the pressure braking operation. The vehicle's engine 17 has the customary intake manifold 49, to which is connected the tube 50, into which latter is inserted any suitable type of shut-off cock 51, and which leads farther to feed the control valve 52 with vacuum suction, supplying the vacuum motor 53 of conventional-like flexible rubber diaphragm type, as employed in some devices as vacuum booster brakes, for forceful forward movement through suction of the diaphragm rod 54, attached by means of customary metal reinforcing plates to the rubber diaphragm 55, which as usual is constructed cup-shaped and has the flange 56 held and sealed as customarily between the dual flanges of the two sections of the cup-shaped halves of the vacuum motor 53. The forward end of the rod 54 is threaded to accommodate the mounting nut 58, clamping the diaphragm assembly firmly against the shoulder 59, the nut 58 adapted to abut against the rubber disc cushion 60 attached to the front wall of the vacuum motor. The initially tensioned conical compression spring 61 urges the diaphragm and the rod 54 constantly rearward.

The vacuum motor 53 is fixedly and suitably mounted from the side channel of the car chassis by means of the bracket plate 62, firmly riveted onto the motor, and which plate together with the corresponding motor wall has a suitably large orifice, which may carry the customary rubber grommet, to permit lateral displacement or tilting of the rod 54 passing therethrough. Also firmly riveted onto the motor 53 are the integral flanges of the bracket 63, of substantially inverted U-shaped cross-section in its main portion, which straddles the disc 45, and having the further horizontal portion 64 integrally bent therefrom and extending also to the car's chassis frame to aid in fixedly mounting the vacuum motor assembly. Formed out of said portion 64 is the vertically depending integral ear 65, having a bearing pivot punching slotted to open to the rear side for accommodating the pin 66 about which the disc 45 normally rotates. A duplicate bearing ear portion 65' as said 65 symmetrically depends also from the other leg of the U bracket, so that the said twin ears of similar contour and open slotted bearing, support the pin 66 at both its ends. The said open slots of the twin ears would permit the pin 66 and the disc carried thereby to shift radially rearward.

The elongated slot 67 (Figs. 1 and 5), punched in the upper semi-cylindrical portion of the bracket 63 accommodates and partially guides laterally the lock disc 45 to an extended arm of which is revolvably pivoted at 68 the rod 54. The functionally outer periphery 45' of the disc is circularly concentric with the bearing pin 66 and is punch-pressed bevelled and somewhat rounded adapting it to properly fit and wedgingly socket into the V-groove 69 (Fig. 5), milled in the solid cylindrical wedge stud 70 fixed transversely in both legs of the bracket 63 in any suitable manner as by press-fitting or peening. The relation is such that when the bearing pin 66 is firmly socketed forward in its bearing slots of the twin ears 65, the said bevelled periphery of the disc 45 is free to move without functional seizing in the said V-groove 69. If however, the disc 45 is forcefully bodily shifted rearwardly, in the direction of the wedge stud 70, the said bevelled edge of the disc wedges against the slanting walls of the said V-groove, thereby frictionally locking against further rotation of the disc, having the purpose of anchoring the pivot 46 against forceful rearward movement, the locking effect increasing with such force.

The pin 66 preferably bears in a suitably wear- and antifriction surfaced bearing bushing 71 (Fig. 6), preferably loosely fitting in a commensurate punching in the disc 45, for slight rockability for self-alignment and for facile replacement. A similar bearing bushing of similar fit accommodates the pin 46 carried by the actuating spring yoke 44, the twin double washers 72 and 72' with suitable loose fit about the said bushings, serving as spacers in the assembly.

It becomes obvious that clockwise rotation of the disc 45 about its bearing pin 66 (viewing Fig. 1), as urged by the tension of the strong actuating spring 39, and as would be permitted when the vacuum suction is released from the motor 53, would cause the rod 38 to move forward, thereby forcing the lever 22 also forward with it, to force the master cylinder piston into the master cylinder 18 for brake application, provided that the foot resistance on pedal 11 prevents the point 23 on lever 22 from likewise moving forward. Vacuum tension of the motor on the rod 54 coacting with the forward tension of the actuating spring 39, assures that the disc bearing 66 remains firmly forward in its open-slotted bearing sockets, thus assuring that the periphery 45' of the disc remains free to move non-bindingly in the V-groove of the wedge stud 70.

The vacuum control valve designated as 52, which embodies also the check valve in combination, serves to control the clockwise brake applying rotation of the disc 45, and also the extent of such rotation as controlled by the brake pedal, thereby controlling the graduability of pressure braking. Though any suitable valve structure may be employed, the design disclosed in detail in Fig. 2 provides fair leak-proofness for a duration of time, not always otherwise attainable for vacuum pressures. The check-valve portion of Fig. 2, which I will first describe is shown in the valve-closed position. The valve body 52 at its upper extremity is of shallow circular cup-shape, providing the continuous annular chamber 75 enclosed by the outer upstanding rim of the cup, over which an inverted shallow circularly cup-shaped rubber diaphragm 76, having a center orifice 77, snugly and sealingly fits, the metal enclosure cup 78 snugly fitting thereover to anchor the edge of the rubber diaphragm, aided preferably by rubber cement or any suitable provision, to enclose the valve and diaphragm against atmospheric pressure. Concentric with the said outer rim of the valve body, is the continuously annular smaller seating rim 79, of preferably slightly greater height over the outer rim, providing accordingly a check valve seat against which the soft rubber diaphragm 76 sealingly bears, for closing communication between chamber 75, which is in constant communication with the control valve intake chamber 80, and the chamber 81 in constant communication with the intake manifold of the engine 17 and with the chamber 82, due to the orifice 77. When the vacuum suction from the engine, namely the suction in the chamber 82 is greater than that of the chamber 80, the diaphragm 76 rises off the seat 79, opening communication between the chambers 80 and 81 for greater vacuum supply to the control valve portion. Inversely greater suction in chambers 80 and 75 close such communication, the area of the diaphragm and its softness aiding to effect secure valve seal. The customary small spring employed in check valves, as would be a small conical spring between cap 78 and the diaphragm 76, for secure valve seating, was found to be unnecessary though its use is optional.

The control valve portion of the valve 52 comprises cylindrical bores in the valve body 52 and recess, as disclosed in Fig. 2, to accommodate the initially tensioned valve closure spring 83 of the compression type, bearing against the valve body at its upper end, and pressing downward against the perforated circular guiding disc 84, fitting onto the cylindrical stub end of the symmetrically round metal stem 85, having the somewhat conically shaped metal disc 86 integral therewith, which however may optionally be a separate member, which disc conically flexes and therefore provides initial tension to the upper flange 87 of the soft rubber valve spool (Fig. 7), having a cylindrical axial bore to fit for snug firm contact over the stem 85, which stem has a restricted diameter at its lower end to provide a stop shoulder against which the circular slightly conical backing plate 88 with an axially centered hole, bears. Fitting over said lower end of the stem 85, is the axially drilled operating stem 89 extending out of the valve body for abutting thrust contact by the valve lever 90 (Fig. 1), pivoted at 91 in the bearing yoke integral with the valve body 52. The said stem 89 and consequently the valve stem 85 is axially guided by the circular perforated disc 92, held in the bore of the valve body by the drawn cup 93, enclosing the air-filter material 94, and having suitable perforations for air passage, which cup furthermore has a center hole to accommodate and guide the operating stem 89 at its smaller diameter restricted to prevent loss from the assembly. Just as described for the conical disc 86, the disc 88 is adapted likewise to bear against and give initial tensioning to the lower flange 95 of the rubber valve spool, when the valve lever 90 should forcefully press the stem 89 upwards against the tension of the spring 83 to raise the valve assembly of inner parts for brake application by exhausting the vacuum from the motor 53, in other words by inlet of atmospheric air pressure through the air-filter 94. The valve body 52 has a continuously annular recess providing the chamber 97, which is in constant communication with the bore 98 leading into the vacuum motor 53, the nut 99 firmly mounting the valve to the motor. Fig. 7 shows a somewhat enlarged view of the rubber valve spool in normal tension-released condition, as manufactured, its flange 87 being of smaller diameter than its flange 95 to facilitate assembling and disassembly in the valve body, the corresponding bores of which are correspondingly of different diameters for proper seating of the rubber valve spool on the periphery of said bores. The shown normal brakes-released position of the valve parts imparts communication between the chamber 80 and the vacuum motor 53, the rubber spool flange 87 being advanced away from sealing contact with the respective bore periphery of the valve body. The flange 87 rests on the edge of the lower flange 95 enabling a substantial amount of pressure from the spring 83 to effect more secure seating of the valve without danger of forcing the rubber valve spool out of proper assembly. Inversely, the substantially similar condition applies for vacuum exhaust namely for air inlet through the filter 94 upon forceful upward movement of the valve parts by the lever 90. The relative dimensions however, are preferably such that if the rubber spool valve is moved upwards to intermediate or neutral position, both flanges 87 and 95 seal their respective valve ports with a tension imparted by the conicality of the respective backing discs, which are spaced apart an overamount to permit free flexing of the rubber valve flange edges.

The valve lever 90 (Fig. 1) is connected to be operated for vacuum exhausting of the motor 53 by depression of the brake pedal 11, wherefor I provide a connecting rod 100, pivoting at 101 to the floating lever 22, in which valve rod is inserted a movement compensating spring device 102, the construction of which is similar to that of the cushion spring device enclosed in casing 28, and as previously described; though this device 102 contains a less heavily tensioned spring and has a considerably longer movement amplitude than the previously described device of enclosure 28. It permits forceful elongation of the valve rod 100 after the lever 90 has abutted against the valve body 52 as a stop, and as induced by an overlong depression stroke of the pedal 11. The initial tension of the spring in the device 102 predominates over the tension of the valve spring 83 in the valve 52.

The characteristics of the floatability of the L-shaped lever 22 and its associated connections, imply that depression of the brake pedal 11 as well as the actuating spring-induced forward movement of the rod 38, would both tend to force pivot pin 33 forward for brake application. Accordingly, it becomes virtually a race of speedier movement, as to which of the two predominates for at least a greater portion if not all of the brake application effect. But if the actuating spring 39 is made sufficiently strong, such as might accomplish wheel-locking under normal conditions, its promptness of action virtually assures that the pedal during all normal graceful braking becomes virtually merely the controller for the power actuation. However, if the pedal 11 were to be depressed with frantic speed, without employment of a correspondingly strong actuating spring 39, which itself has relation with the cumbersomeness of the braking system as in heavier trucks, the pedal might be depressed to the toeboards of the car, preventing further control beyond the capacities of the actuating spring 39. Furthermore, there is a psychological requirement or at least desideratum, for an utmost safety provision, though never operative. To attain such objects, I provide a liquid dash-pot 103 to retard overmovement of the brake pedal 11, and which is brought into operation preferably though not necessarily after a lost-motion, corresponding with the normal stroke of the pedal. The lower arm 19 of the brake pedal carries an integral substantially conically shaped guiding and abutment socket to contact the operating stem 104 (Fig. 3), having a hemi-spherical rear extremity socketing in a corresponding abutment depression of the substantially drawn cup-shaped steel sheath 105, fitting closely over the forward end of the automatic-screw-machined piston 106, which carries an annular groove at 107 for spinning the said sheath fixedly thereon. Said sheath permits assembly onto the piston 106 of the continuously annular double-lipped soft rubber piston ring 108 (having the same function as the customary rubber cup), having a liquid sealing lip against the inner wall of the aforesaid sheath 105, and having another larger diametered lip 109 to ride as customarily along the smooth bore of the body member 103. The disclosed sealing rubber form permits, in a small diametered bore, of a substantially strong piston shank to pass therethrough to form an integral rear portion of the piston 106, having a guiding and liquid deflecting shoulder 110, having further a reduced diameter portion establishing the continuously annular chamber 112, and a further suitably fitting shoulder 113 for dash-pot by-passing, namely for liquid escape from the high pressure chamber 114 into the low pressure chamber 112, which liquid thence passes through the bore 115 into the connected tube 116 (Fig. 1) communicating with the conventional hydraulic pressure line 117; shown as leading rearward namely to the two or more rear vehicle wheels, as customarily. For more prompt return of the piston 106 (Fig. 3) and its assembly after brake release, which return is actuated by the hydraulic line pressure, I provide an axial bore in the piston 106 establishing the chamber 118 closed by a check valve of comparatively large exposed area which comprises the valve disk 119 adapted to seat against the bore rim, a truncated cone-shaped guiding boss being provided on said disc, which has further a wire affixed therein the hooked extremity of which supports one end of the tensioned tensile spring 120 the other end of which is looped in the bent cross wire suspended transversely from the two diametrically opposed drillings in the piston, as 121, which serve for liquid communication between the chamber 112 and chamber 118, which in turn supplies liquid to the chamber 114 through the check valve upon piston return forwardly. It is apparent that the high dash-potting pressure of chamber 114, due to forceful rearward thrusting of the piston 106 by the lower pedal arm is not communicated to the hydraulic brake lines nor against the rubber lip 109. However, in anticipation of possible check valve leakage, some may deem it preferable to provide a large liquid escape area to the bore 115 and the connecting tube 116, particularly if the shown dash-pot unit is desirably also to supply copious emergency liquid to the wheel brakes. But the check valve 119 is not necessary, if slower return of the piston 106 is deemed satisfactory, the sole communication from the chamber 114, then being around the periphery of the enlarged piston collar 113, or through any substitute or supplemental by-pass drilling. In view of possible check valve leaks, some may furthermore prefer to make the communication drillings 121 very small to aid in restricting liquid passage for effective dash-potting function, though not as effective as when the check valve is in proper operation. The dash-pot unit is mounted on the car by affixing its flanged ears onto a fixed member 123 of the vehicle. The stem 104 is tiltable for alignment by reason of the enlarged shoulder 124 and its ball socketing provision, the shoulder adapted to stop against the pressed annular retainer 125 fixedly spun onto the body member 103, surmounting which is the conventional-like rubber dust boot 126. The disclosed dash-pot may not need attention for the life of the car, in view of the secure supply of liquid and of the infrequency of operation enhancing the durability of the rubber piston ring 108; such attention-proofness being an important factor on elements of a brake under the care of the general public.

The aforesaid hydraulic brake line 117 (Fig. 1), has free communication with the master cylinder 18 through tube 128, which supplies also the branch duct serving the front wheel brakes of any suitable conventional construction, as that of the so-called genuine Lockheed type, comprising the double hydraulic cylinder 129, the dual pistons of which act against the brake shoes as 130 by opposing the tension of the shoe retract spring 131 to brake the drum 132 affixed for rotation with the automobile wheel, the fixed bearing pins as 133 fulcruming the shoes, which in their retracted position bear against the clearance adjuster eccentrics, as 134, all as suitable or conventional. The brake line 117 leads to the vehicle's rear wheels.

I provide furthermore an accelerator disconnector or tripping mechanism, enabling the driver's foot to remain partly or even mostly over the accelerator pedal 15 without affecting the engine, while braking with a lightly pressured brake pedal 11, the accelerator disconnector serving also as an indicator to the driver of vacuum failure of the motor 53. The accelerator pedal 15 has the connecting thrust link 136, projecting through the toeboard 13 and pivoted on an arm extension of the flat stamped lever 137, mounted freely revolvably about the bearing stud 138, which itself is revolvably pivoted in the fixed bearing journal 139 mounted onto the toeboard 13. The lever 137 has an outer periphery substantially concentric with its axial center 138, which periphery carries a detent 140 to coact for engagement, after some lost-motion as shown, by the pawl 141, rockably pivoted on the lever 142 firmly affixed for unit revolution to the bearing stud 138. For installations in which the throttle valve 16 is on the other side of the engine 17, this bearing stud 138 may be elongated axially to accommodate suitable lever and link system for throttle operation, as is customary on some cars. On the lever 142 is pivoted the link 143 connecting with the lever 144 of the throttle valve 16 which is urged to closed position as customarily by the tensioned tensile spring 145. Firmly affixed to the pawl 141 is the lateral arm extension 146, pivotally carrying the connecting rod or wire 147, the lower end of which (Fig. 6) passes through a bore in the stud 148 affixed firmly to the yoke member 44, the rod 147 having its extremity bent 90 degrees to serve as abutment for the stud 148, for pulling, after suitable lost-motion, the rod 147 and accordingly the pawl 141 for accelerator release during the first part of clockwise revolution of the disc 45 (Fig. 1) for brake application. The lost-motion at the detent 140 is consistent with at least many throttle operative installations on cars of today, and I have found that the promptness of the power actuation of the brakes, which promptness may surprise the layman, if a strong actuating spring 39 be employed, removes the pawl 141 from the path of the periphery of the lever 137 without any sliding friction or wear on said pawl. The brake pedal 11 and the accelerator pedal 15 are preferably placed in close lateral adjacency, preferably by extension of the foot pad 14 towards the accelerator pedal. The tensile spring 149 urges the pawl for detent engagement; and the torsion spring 150 about the pivot rod of the accelerator pedal's mounting on the toeboard 13, urges the accelerator pedal into full retracted position, as shown, with the extended arm of the lever 137 stopping against the under side of the toeboard. It becomes apparent that the accelerator will become or remain disconnected upon failure of the power motor 53 to revolve the disc 45 anticlockwise upon brake release, thus serving as an indication to the driver that the brake pedal 11 is gradually assuming or has assumed a more rearward retracted position for subsequent brake operation. The usual hand throttle of the automobile may be employed for engine control during such rare emergency. If there be any disorder in the power system which would require repairs, the vacuum shut-off cock 51 at the engine may be turned off and the accelerator disconnector rod 147 be removed for temporary car operation.

*General operation of the device of Figs. 1 to 7*

The device is shown in the normal brakes-released position, with the brake pedal 11 held in its normal low position, the driver's foot being off of it, with the vacuum motor 53 being fully charge with vacuum suction, hence with the lock disc 45 in full counterclockwise position, and with the actuating spring 39 compressed. Without vacuum leaks in the valve 52 and the motor 53, the mentioned shown positions would be maintained while the engine 17 is turned off. However, we will suppose the engine to be operating to provide a vacuum source.

For braking, depression of the pedal 11 moves the rod 21 and pivot 23 rearward as a unit because of the firm initial tension of the cushion spring 24, thus causing the floating lever 22 to slightly rock on pin 36 as fulcrum, and giving rearward movement to the valve rod 100 as a unit because of the initial tension of the spring of device 102 being greater than the valve spring 83 in moment, thereby causing the valve stem 85 (Fig. 2) to move upwards to first close communication from the motor 53 to the engine manifold 49, and immediately thereafter to exhaust the vacuum suction from the motor 53 by exposing it to atmosphere. This permits the lock disc 45 to rotate clockwise on its pivot 66, as urged by the strong actuating spring 39, which further rocks the floating lever 22 in a counterclockwise direction on point 23 substantially as a fulcrum, causing consequent forward movement of the pin 33 to apply the brakes by forcing liquid from the master cylinder 18 to the several wheel brakes of the vehicle. At the very beginning of such actuation, reaction pressure is immediately built up against the brake pedal and driver's foot, to usually cause an appreciable kick-back feel, if some provision as that of the cushion spring 24 were not provided, which provision is preferable. The forward reaction pull of point 23, if overquick would compress the spring 24 tending to partially check the exhaust valving through resultant movement of the rod 100. Another optional exhaust provision is had in the closeness of the valve throat disc 88 (Fig. 2) and its edge taper in respect to the corresponding valve bore, and the arm length of the valve lever 90 somewhat affect the valving. An optional and preferable function of the cushion spring 24 is also to cushion the pedal feel throughout the range of pressure braking, if so desired, by suitable spring design.

As point 33 of the lever 22 moves forward towards point 33', as the ultimate limit for non-adjusted brake linings, the point 23 will move downwards towards point 23", in which position the effectual total distance from the cushion spring 24 to the valve lever 90 is effectually shortened in linkage, due to the incidental location of the valve 52 in respect to the non-parallelism of the links 21 and 106, as disclosed, thereby tending to spontaneously further exhaust vacuum from the motor 53. But this effect is compensated for by locating the pivot 101 on the lever 22 at some distance above point 23, so that the anticlockwise rocking of the floating lever on the pivot 23 substantially would compensatingly lengthen the valving control linkage effectually during progress of the brake applying movement. Other valving connection structures are feasible to forestall such requirement, such as connection of the rod 100 closer to the pedal's lower arm, as on the spring case 28, or as is suggested by Fig. 8 with its cushion spring substitute 225 and the lever 220 as virtually a substitute lower arm for the brake pedal. However, I prefer to locate the point 101 on the lever 22 still higher than required for the just indicated compensating function (without dependence on quantitative accuracy in the drawings), to accomplish the additional effect of requiring the pedal pad 14 to be gradually more depressed for gradual exhausting of the vacuum motor 53, thus serving somewhat as a substitute for the spring 24 for valving graduability, and having the further desirable effect that the pad 14 upon brake release will not retract too great amount rearward than its original starting point, due to the fact that the valving exhaust and the inlet strokes are not fully coincident, and also to the time element required for power operation, though small. Optionally either the provision of the spring 24 or the just explained pedal stroke graduability due to higher location of the point 101 on the lever 22 may be employed alone, the combination of the two as shown however being preferable to gain the specific advantages of each; and both combined might designedly impart about ½" depression movement to the pedal pad 14 for normal pressure braking (upon readjustment of the wheel brakes for lining wear), which depression amount, however, with consequent foot feel is variably optional, the longer the pedal stroke the finer the valving control.

During the effectual graduated pressure range of braking, the master cylinder piston, as conventionally, has comparatively very small movement range. If, by preference, a tension is chosen for the actuating spring 39 about sufficient to impart full range braking pressure normally up to about wheel-locking, the valve lever 90 may throughout such pressure range of braking hover and slightly move oscillatingly between the exhaust, neutral and intake positions of valving for required vacuum pressure graduability, or hovers between the exhaust and neutral positions only, such valving being controlled (barring operative friction losses and lag), accordingly as predominance of force from the pedal 11 or from the actuating spring 39 affects the position of the point 101 effectually for valving, the spring 24, if of corresponding tension variation is chosen, yielding correspondingly. This implies that the foot pressure on the pedal determines and varies ad libitum, the actual braking pressure, which function is further assured by the differentially connected floatability of the lever 22.

For brake release, the foot release of the pedal 11 permits the pivot point 23 to move forward partly urged by the tension in the braking system at the time, thereby permitting the valve stem 85 (Fig. 2), as urged by the spring 83 to move downwards towards the shown position, thus cutting off atmospheric communication and instantly thereafter opening communication between the chambers 98 and 80 for vacuum inlet to the motor 53, which imparts counterclockwise rotation to the lock disc 45, compressing the spring 39 and returning the lever 22 rearward to the shown position, thus also carrying rearward the radius lever 29 and the master cylinder piston until the radius lever 29 abuts against its stop 32, assuring incidentally the surplus free movement as conventional for master cylinders, to securely clear the conventional small liquid compensating orifice of master cylinders. The shown brakes-released position of the pin 36 is determined by the contact of the nut 58 against the silencing stop cushion 60 in the vacuum motor 53. The brake pedal 11 accordingly must assume the normal low position shown, the spring 152 on the lower arm of the pedal lever urging the radius lever 29 against its stop 32, which spring 152 being optionally attachable anywhere, as directly on the radius lever to accomplish the same purpose.

Now, as to the locking function of the disc 45 and the wedge stud 70. At exceptional times, as after over-thorough car washing, etc., an overamount of foot pressure is required for efficient braking. Furthermore, it is optional to employ a lighter actuating spring 39, and consequently of the vacuum motor unit, particularly in a comparative sense in heavier vehicles, as trucks, etc. With predominant foot pressure over the capacity of the actuating spring 39, the rod 38 would tend to move rearwards. But concurrent with such condition, due to overdepression of the pedal, the total vacuum would become exhausted from the vacuum motor through valving, causing the conical spring 61 of the motor to move the piston rod pin 68 rearwards thereby bodily shifting the disc 45 somewhat rotatively, so that its bevelled edge periphery 45' incipiently wedges into the V-groove of the stud 70. Any further rearward directed force on rod 38 would amplify the wedge locking to prevent the disc 45 to rotate, thereby fixing the position of the pin 46 for any overpressure braking by the pedal. The said conical spring 61 is not essential, particularly in view of the usual stored tensions in rubber cupped diaphragms, but it aids to relieve from pedal operation a large part at least of the lost-motion required for shifting the disc 45. It is characteristic of such V-grooves as 69 in the wedge stud 70 that its wedging coefficient does not vary proportionally with the frictional coefficient of the wedge walls, so that one might state in terms of convenience, that a rough or rusted periphery of the disc 45 would not sink into the V-groove so deeply and hence not overbind with proper design; whereas if oil were spilled over a smooth disc periphery it would sink in more deeply and aid wedge locking, the compensation being a matter of degrees, and not complete. The disc radius is of course a factor for the locking efficiency. The normally free fit between the disc 45 and the wedge stud 70 is preferably to be feasibly close versus lost-motion requirement, and the wedge stud at least ought to be case-hardened or heat treated otherwise.

As hereinbefore described when reciting the several parts, the accelerator pedal 15 becomes disconnected by reason of the pawl 141 being raised out of the detent by the initial brake applying rotation of the disc 45. The customary condition of lost-motion or ineffectiveness of accelerator pedal operations is taken advantage of by providing a corresponding amount of lost-motion at the detent 140, to an extent, at least for some cars, that there be no sliding release friction and consequent wear on the pawl, the power actuation responsive to the initial brake pedal depression being surprisingly prompt. The driver's foot may merely slightly rock on its heel to top the edge of the lightly pressured brake pedal providing quick and convenient brake application. The accelerator disconnecting device also serves to give notice to the driver when the power motor 53 fails to retain the brake pedal 11 in its shown normal low position, as previously described.

As to the emergency long-stroked positioning of the pedal 11, indicated by the dotted outline 11' (Fig. 1): If for some reason the motor 53 fails to reenergize the actuating spring 39, and hence fails to move the pivot 36 and the lever 22 back to its shown position for low-pedal, the pin 36 in its then forward position, will serve as a fulcrum point for clockwise rotation of the lever 22, as urged by the tension of the brake liquid in the master cylinder and further by the spring 152, to pull the rod 21 forwards and accordingly position the pedal 11 in its long-stroked position 11', at least approaching such position according to the amount of residual vacuum remaining in the motor 53. For subsequent braking the pivot 36 would remain the fulcrum point during depression of the pedal 11. The valve lever 90 would swing with large amplitude freely on its pivot 91.

Because normally the disclosed power actuation imparts substantially the whole free movement of brake shoe setting onto the drums, the feature of pedal lightness, through leveraging or relative displacement, may be taken advantage of by designers to a degree, which might imply an inconveniently long-stroke of the pedal lever 11 for the rare emergency condition, particularly in relation to heavier vehicles. Though many leveraging change principles are known in the art, which might be applicable, I show the floating lever 22 to be of bell-crank or L-shape functionally, so that the point 23 would assume the position 23' for the long-stroked pedal position, the gradual leverage changing function during progress of brake application being evident. It should incidentally be noted that during normal braking, the lowering of point 23 to 23" implies an increase of leverage which partly at least compensates for the loss of tension in the spring 39 during its operative elongation for normal braking. It is however optional to disregard the desideratum that the master cylinder piston be fully retracted, even in the later or "pumping" forms of master cylinders, so as to always uncover the small liquid compensation port, and hence that the pedal lever 11 for the rare long-stroked emergency condition, strike against the bottom of the toe-boards as a stop, thus releasing all of the higher pressured liquid for at least a substantial part if not total brake shoe retraction, during such emergency condition.

The Device of Fig. 8

The general principles of the device shown in Fig. 8 are the same as underlie the device of Fig. 1. It is of more enclosed movement-concealing design, and is adapted especially to operate the hydraulic standard conventional wheel brakes of the vehicle. The device is shown in the normal brakes-released position.

First, I will describe the power actuator unit shown in the upper left of the drawing of Fig. 8. The vacuum supply tube 161 leads from the engine intake manifold to the combined check and control valve 52a, of identical construction and functioning as that of valve 52, of Fig. 2, except that a more strongly tensioned valve spring 83 may be employed. This valve controls the suction pressure in the rubber diaphragmed vacuum motor 162, of the same structure principles as motor 53 of Fig. 1 except that the disc portion of the cupped rubber diaphragm (shown in Fig. 1) is usually eliminated in larger diametered motors for cost reasons, which motor has the metal diaphragm disc 163, carrying the plunger stem 164, affixed thereto by the threaded nut 165, holding also the metal cup 166, telescoping into a corresponding cupped portion 167 of the motor, coacting with the walls of said cupped portion to partially guide the motor's movable diaphragm into movement alignment, and to serve for lateral retention against breaks for the heavily initially tensioned compression spring 168, which is the brake applying actuating spring in this device and may be constructed of so-called flat wire, as shown, though a nest of round wire spring might suitably be substituted therefor, which actuating spring bears against the circular reinforcement and spring positioning plate 169 of upturned edge. The spring further bears at its moving rear extremity against the motor diaphragm assembly to urge it constantly rearwards with strong force for brake application, but which tendency is resisted by the vacuum suction admitted to the motor's chamber 169 by the valve 52a. The outer edge of the circular plate 163, where the rubber diaphragm is, as usual, sealingly joined thereto bears against the inner wall of the motor as a stop for the diaphragm's forward movement, or alternatively, closure of the coils of the spring 168 may serve such purpose. For free exit or entry of displacing air in the dead or rear portion of the motor 162, I provide the air-filter material 170, held in place by the perforated plate 171, perforations as 172 being constructed in the corresponding wall of the motor for suitable air passage.

The aforesaid diaphragm plunger stem 164 has its rear extremity rounded as customarily for thrust abutment against the standard conventional master cylinder piston for the conventional master cylinder 173, the whole master cylinder unit preferably structured and functioning as the standard master cylinders equipped on the cars produced today the structure being apparent from Fig. 10. The master cylinder 173 has the triangular-shaped mounting flange 174, as on some conventional types, which fixedly mounts it on the motor 162 by means preferably of suitable screws, the motor bracketing angle plate 175, adapted for fixedly mounting the assembly unit onto the car, being inserted and held therebetween, which angle plate has a guiding bore 176 to accommodate and guide the plunger 164, and has other suitable punching as indicated at 177, for properly copious displacement of air communication for the master cylinder unit. Any incidental brake liquid leakage from the master cylinder is preferably shunted by the said angle plate 175 and permitted to escape through some duct as indicated at 178. It becomes obvious that upon vacuum exhaust from the chamber 169 of the motor, the actuating spring 168, after first travel through a slight customary lost-motion, causes the plunger 164 to abut and press against the master cylinder piston, moving it, as conventionally, to force brake liquid into the hydraulic lines for brake application, as will hereinafter become more fully apparent. The standard conventional master cylinders comprise a small liquid compensating port (as 259, Fig. 10) uncovered at full retraction of the piston, by the rubber piston cup, and comprises also the double-acting check-valve (as 252, Fig. 10) at the outlet passage, all as conventionally.

The master cylinder's outlet tube 180 conducts brake liquid flow and pressure partly through the tube 181 to the accelerator disconnector device, comprising the fixed cylinder 182 carrying the rubber piston cup 183, backed by the shoulder enlargement of the round stem 184, having a restricted diameter to pass through an orifice in the cylinder, establishing a shoulder for stop abutment with the cylinder, the tensioned compression spring 185 of predetermined tension bearing upwards against the enlarged shoulder to constantly urge the rubber sealing cup 183 towards stop contact with an extended cylindrical boss integral with the sealing plug 186, which has a T-shaped duct 187 drilled therein to favor escape of any trapped air through the tube 181 firmly and sealingly joined thereto in any suitable manner. Integral with the cast cylinder 182 is the forked bearing extension carrying the pivot pin 188 and the lever 189 for operative abutment against the extremity of the stem 184 after some lost-motion, and which lever has the integral eye 190 through which passes and against which abuts the accelerator trip rod 147a, serving the same purpose as the rod 147 of Fig. 1. The tension moment of the spring 185 is preferably less than that of the several brake shoe retract springs of the vehicle wheels, but is stronger than that of the residual hydraulic pressure remaining in the brake lines during brake released condition.

The master cylinder 173 communicates its liquid further to the fixed pedal cylinder unit indicated as 191, through passage 192 leading to the chamber 193. This pedal unit assembly is fully symmetrical about the cylinder's axis, except for the two tube connections and the air-relief provision, as apparent in the drawing of Fig. 8. The chamber 193 is sealed at its forward end by the movable rubber piston cup 194, backed by the shoulder enlargement 195', against which presses the predeterminedly tensioned compression spring 196; and which shoulder 195' is integral with the round stem 195, a restricted diameter of which passes through a center orifice in the closure and retaining plate 197, held in place by the customary split ring 198 socketing in the cylinder bore wall, which plate through abutment limits the outward movement of the stem 195. This stem 195 has an integral extension passing through the rubber cup 194 and through the retaining washer surmounted by the threaded nut 200 firmly screwed onto the stem, which extends still farther to project into the restricted throat of the cylinder casting, so as to operatively abut against the valve ball 201, adapted to seat on the rim of, hence to seal said throat, and which ball is urged for such seating by the compression spring 202 bearing against the ball at one of its ends and against the radially outwardly extending flange of the guiding and ball-resting tube 203, perforated for free liquid communication, the assembly being held in place by the bushing 204 firmly threaded into the cylinder 191. The chamber 205 is in constant free communication with the several hydraulic wheel brake cylinders of the vehicle, by means of the passage 206 leading to the tube 207, thence to the wheel cylinders as conventionally. The aforesaid bushing 204 has a central cylindrical bore to accommodate the metered choking stem, having the restricted diameter portion 208 and a further portion 209 of larger diameter, the latter when passing into the bore of the said bushing 204, upon an over-amount of brake pedal depression, restricts the passage of liquid and hence serves as a choke to retard the brake pedal depression, as a substitute in function and purpose for the dash-pot 103 of Figs. 1 and 3 and in like manner optional. The smaller diameter, which is optional, serves as partial choke, as suitably desired, during the normal low-pedal positioned braking.

The said choking stem 209 is integral with or suitably held for comovement with the stem 210 integral with the cylindrical steel piston member 211, riding in the cylinder bore, against the forward shoulder of which is mounted the inverted rubber sealing cup 212, which is backed by a steel washer over the stem 210, against which washer bears the operative rubber sealing cup 214 held further in the assembly by a further steel washer firmly clamped by the nut 215 screwed onto the stem 210, the whole described piston assembly moving as a unit to force brake liquid pressure from the chamber 216 into the chamber 205 through the bushing 204. For escape of air, trapped when the system is being filled with liquid, I provide a suitable or customary sealing air relief screw 217 controlling the two small ducts shown as communicating respectively with the chambers 216 and 205.

The said piston assembly, particularly the member 211 is thrustingly abutted against for pedal actuation by the thrust rod 218 connecting by means of its yoke and, at the pivot pin 219 with the lever 220, which itself is pivoted by pin 221 to the brake pedal 222, rotatably mounted on the fixed bearing pin 12. In the well 224 formed integral with the said pedal is mounted the predeterminedly tensioned compression spring 225, of predetermined movement amplitude and tension variation (it corresponds to the cushion spring 24 of Fig. 1), the other end of which spring functionally bears against an enlarged circular shoulder 226 integral on lever 220 to urge said lever constantly forwards, but which tendency is stopped by the adjusting screw 227 locknutted onto a lug depending integrally from the pedal boss. At the lower extremity of the lever 220 is pivoted the valve rod 100a leading forward for connection with the valve lever 90a, and having inserted therein the movement compensating spring device 102a, of identical construction and purpose as the device 102 of Fig. 1, except that its spring may be of higher tension to predominate safely over the valve spring 83 (Fig. 2), because said spring 83 may be of somewhat stronger tension, as above indicated, in this device of Fig. 8. To enhance the maintenance of the customary and apparently desired residual pressure of the conventional brake lines, and in view of flexure of chassis frames, relative movement oscillations of the engine, and inertia of the brake pedal, I preferably provide additionally the otherwise non-essential device comprising the predeterminedly tensioned compression spring 230, bearing against the radially outwardly extending flange 231 of the tube 232, the rear edge of which is again outwardly flanged to checkingly overlap the annular washer 233 (Fig. 9), against which the other end of the spring 230 bears, and through which the cylindrical portion of the tube 232 axially slides, which washer in turn bears against the customary split ring 234, fixedly socketing in the cylinder casting 191. The piston assembly and more particularly the member 211 bears against the forward tube flange 231, which accordingly serves to stop and locate the piston normally during brake-released condition, so as to provide some non-interference lost-motion space, as shown, between the rod 218 and the member 211. The customary rubber dust guard is indicated by 235; and the tensioned tensile spring 236 serves to urge the pedal 222 towards the depressed condition. To serve convenience the accelerator pedal is not shown in Fig. 8, as mounted on the toe-board 13, the construction and functioning of the accelerator pedal herefor being the same as that disclosed for Fig. 1. The communication of the tube 207 with the representative wheel brake shown is intelligible from the disclosure with Fig. 1.

As to the relative dominances of forces in the system, in terms of hydraulic pressure moment: In the shown brakes-released position, the spring 230 dominates the customary residual pressure of the brake lines, which is perhaps about 8 lbs., but the tension of the spring 230 is inferior to that of the brake shoe retract pressure, as that of spring 131a. Such shoe retract tensioning is to be sufficient, of perhaps about 25 lbs. to securely dominate the combined tensions of the spring 230 and of the pedal spring 236, so as to be effective to move the brake pedal 222 rearwards for the emergency long-stroke position 222', to be later more fully described, instead of applying the brake shoes to their drums. The pedal 222 is held in its shown normal low position by virtue of the adequately tensioned valve spring 83 (Fig. 2), of required magnitude to securely seat the valve and overcome the pedal spring 236. I chose the same valve spring to accomplish this purpose for simplicity reasons. The tension of the power or actuating spring 168 might optionally be chosen to effect about 300 lbs. hydraulic pressure onto the liquid system, in its operative expanded condition, which pressure should within a safe margin dominate actuation of the spring 196, which latter might optionally be actuated by about 150 lbs. The ball valve spring 202 might optionally permit about 10 lbs. pressure to by-pass automatically the ball valve, as a one-directional check valve when seated, namely for flow from the chamber 193 to the chamber 205. Accordingly during operative braking under pressure, about 150 lbs. pressure imparted to the liquid by the controlled application of the actuating spring tension would begin to force the rubber cup 194 (supposing that the additional force from the ball valve spring 202 compensates for resistant friction), forward to free, with some additional lost-motion, the ball 201, permitting it to seat for by-passing further liquid as a check-valve. When however vacuum actuation of the motor 162 recompresses the spring 168 and releases the master cylinder pressure for brake release, the consequent pressure reduction in the master cylinder 173 permits the spring 196 to forcefully press the ball 201 rearwards to open the ball valve for liquid back-flow into the master cylinder 173. This ball valve provision is virtually the functional equivalent of the frictional locking disc 45 and its wedge stud 70 of Fig. 1, and serves the same purpose of checking unwanted reverse force flow during conditions of pedal force predominance. The quantities above given, otherwise optionally variable, are chiefly for elucidation. It merely serves greater safety to provide an actuating spring 168 of such strong tension.

As to general operation of the device of Fig. 8, there are further similarities of function with that of the device of Fig. 1. When the pedal 222 is depressed for brake application, its initial small movement pulls the valve rod 100a rearward for vacuum exhaust from the motor 162, the initial tension of the spring device 102a dominating over the valve spring 83 (Fig. 2). Thereby the actuating spring 168 is free to move the diaphragm 163, and after some lost-motion to move the master cylinder piston forcing liquid through the passages shown as open to the various brake wheel units. Because of the promptness of liquid flow and the concomitant dynamic pressure, reaction is exerted rearwardly against the piston cup 214 in the pedal cylinder, which reaction, if excessive in relation to the foot pressure and progress, compresses the spring 225, rocking the lever 220 on its pivot 221 to choke the vacuum exhaust valving thus aiding to moderate oversudden brake application action. This action of spring cushioning is accordingly similar as described for the spring 24 of Fig. 1, in this respect; and the further pressure graduation valving for desired graduated braking becomes obvious from the description thereof in connection with the device of Fig. 1. However, the feature of Fig 1, of locating therein the point 101 an additional height on the lever 22 to serve partly depression travel of the brake pedal, is not represented in this device of Fig. 8, such feature as previously stated, not being essential. In fact the described cushioning spring provision, of spring 225 of Fig. 8 and spring 24 of Fig. 1, is not strictly essential though decidedly desirable, to prevent at least excessive kick-back feel of the foot, and to obviate the feeling of the brake pedal moving backward through pressure reaction build-up.

The brake release operation is presumably obvious. The accelerator disconnecting device of Fig. 8 however differs in effect from that of Fig. 1, in not indicating to the driver that the pedal 222 is assuming or has assumed the emergency long-stroked position indicated at 222'.

As to the emergency long-stroked pedal operation, this Fig. 8 design differs from that of Fig. 1 in effect, in that whatever brake liquid is at the time trapped in the brake system (such as the surplus liquid previously "pumped" by the master cylinder 173, if such more recent "pumping" type of master cylinder be chosen) will so remain therein, without relief, as conventionally, through the liquid compensating port provided in conventional master cylinders. However, if such trapped liquid retention is deemed undesirable by some designers, who might contemplate delays by the public in attending to repairs of the power motor system, a complete conventionally functioning master cylinder construction with its piston of standard design may be substituted in place of the pedal cylinder 191, but by retaining the shown control valving structure of the cylinder 191, namely the portion thereof forward of the bushing 204 the orifice of which would serve as the outlet orifice of such replacing master cylinder.

Such modification by use of a conventional-like master cylinder structure is presented in Fig. 10, the parts forward of the spring 202 and the parts rearward of the pin 219 being identical to those of Fig. 8. The flanged perforated ball seating tube 250 is retained in the assembly by the threaded bushing 251. The dual or double-acting check-valve designated as 252 comprises the large double-faced seating disc 253, permitting liquid to pass over its periphery from chamber 205 to chamber 254, against the tension of the spring 255, and the smaller disc 256 permitting liquid to pass in the reverse direction against the tension of the light spring 257. Any conventional form of such dual check valve may be employed. When the vacuum powered system including cylinder 173 (Fig. 8) should become inoperative, as above indicated, surplus liquid in the brake lines urged by the brake shoe retract springs, as 131ª (Fig. 8) would force the rubber cup 258 rearwards to an extent if required so that the lip of said rubber cup would fully uncover the very small compensation drilling 259, thus permitting such surplus liquid to pass through the tube 260 into the reservoir portion of the master cylinder 173. A number of such very small compensation drillings may be provided for copious flow. The pedal spring 236 (Fig. 8) securely predominates over the combined forces of the spring 255 and of the normal residual pressure in the brake lines, established by the dual check valve of the master cylinder 173, as above-mentioned, so that the pedal 222 will normally be held in its normal low-position corresponding to the full lines of Fig. 8, when the power system is properly operative. The just mentioned predominance of the spring 236 implies that the rubber cup 258 will seek to cover the compensation drilling 259; therefore the long-stroked position of the pedal indicated as 222' in Fig. 8 will correspond generally with the said rubber cup 258 having just closed such compensation drilling, disregarding thermal liquid retraction, etc. The force of the valve spring 83 (Fig. 2) predominating over spring 236, as previously described implies that the conventional-like "pumping" of liquid by quick pedal reciprocation would be effective for the portion of the stroke of the piston 262 forward of the full-line position of Fig. 10, particularly for foot braking through rod 263 when the power system is inoperative; the liquid chamber 264 fed by port 265, the multiple drilled passages as 266, the form of the rubber cup 258, the spring 255 and the dual check valve 252 serving such liquid "pumping" as conventionally. However, the conventional rubber at the double-acting check-valve 252 to serve leak-less seating is not required, since the pressures in the chambers 205 and 254 may become equalized, if so desired, after serving for the aforesaid liquid "pumping," which itself is not strictly required.

The claims may recite an apparent overlapping of elements in respect to the valve control connection from the pedal, it not being of the substance of the recited structure or invention, to connect the valve mediately through the interconnections of Fig. 1, nor functionally through the cushioning spring.

For conveyance, interaction and compounding of forces, with which we are primarily concerned, a body of liquid may serve in many respects as well as do rigid mechanical elements. For which reason, in the claims, recitation of a movable brake element for brake application may aptly be a body of liquid in combination with or without further structure to the wheel brakes which the body of liquid actuates. Hence there may also be a "connection," as may be recited in the claims, between a body of liquid and a contiguous body of liquid, since in engineering a mere abutment of mechanical members can constitute a functional connection, often as well as intervening members. The liquid flow structure of Fig. 8 presents a differential interconnection as well as that of Fig. 1. The term "pedal" in the claims is to be understood in its broad sense, a thrust rod, for example being suitable in practice for a light-pressured short-stroked foot brake. When reciting primary and secondary pumps in the claims, it is not to be implied that such pumps are distinct in all of their structural elements, since the well-known structure of two pistons working in one cylinder are effectually two pumps; so likewise, for the known structure having one piston working within another. Furthermore, pistons (as part 195) and diaphragms are to be considered equivalents in the absence of an English term comprising both. And, the term "spring" covers a multiplicity of springs.

The prior art discloses a class of devices for taking up the slack for brake setting chiefly to advance the shoes to the drums, and usually to give some additional uncontrolled pressure to the brake system. In view of skidding tendencies on icy roads, etc. it is thought that such initial pressure, to serve practical purposes, should be very light. Reference in my claims to such as "substantial effective braking pressure" comprises the customary controlled pressure braking beyond what might be safely considered as the herein-above indicated initial pressure. It does not however imply the full range of the conventional effective pressure braking, in view of my lock disc 45, etc. The dynamic force required for prompt functioning particularly for hydraulic brakes, binds, freezes, etc. make desirable a force substantially larger than the static pressure corresponding to the said "initial pressure."

Since the invention is primarily concerned with defined actions and interactions of forces, to sustain which a variety of structural forms are known in mechanics or hydraulics, I do not mean to limit myself, in the claims, to the particular structural forms disclosed, except as becomes apparent.

Having described my invention, by means of the chosen disclosed forms, so that one versed in the art can make and use it in suitable advantageous embodiments, I hereto append my claims.

I claim:

1. In a vehicular braking system, an element movable for brake application, power means to move the element, a brake pedal normally held in low short-stroke position, tension means connected to favor the pedal's retraction over operation of the element, and mutually reactive interconnections between said element, means and pedal, said interconnections and the relative forces being such that the operating force from the power means predominates to urge retraction of the pedal to a longer-stroke position, whereas foot resistance against the pedal shunts the force of said means to effectually move the element for brake application.

2. In a braking system having an element reciprocally movable for brake application and release, tensioned spring means to apply the brakes, power motive means adapted to tension said means and to release the brakes, a normally short-stroked pedal adapted to control the operation of the spring and motive means combination, and differentially arranged interconnections whereby the pedal is positioned automatically for a subsequent longer effective stroke to self-sufficiently operate the brakes upon failure of the power motive means.

3. In a vehicle, the combination of an internal combustion engine with a brake system comprising, a brake element movable into applied and released positions, tensioned spring means connected to normally move said element for application, vacuum motor means adapted to operate normally the releasing movement of the element, a vacuum supply connection between the engine and the motor means including valve means to control the supply, pedal control means arranged to variably control the valve means for variable effective braking and cooperative interconnections arranged so that an over-normal retraction stroke of the pedal effects the brake releasing movement of the element upon failure of the power means.

4. In a vehicle braking system, a brake element resistantly movable for brake application, a spring adapted to move the element, a power motor adapted to variably oppose the spring, a pedal arranged upon its depression to cause operation of the spring and motor combination to apply the brakes, and differential reactive interconnections cooperatively arranged so that the spring force would effect over-normal retraction movement of the pedal, whereas foot resistance on the pedal shunts the force to move the element.

5. In a vehicle having brakes, a brake operator comprising, power means to operate the brakes, a variably positionable pedal arranged with associated operable connections to control the power at its normal low position and to operate the brakes upon failure of the power at its long-stroke position, and means whereby the power means when conditioned for proper operation automatically positions the pedal to its normal low position.

6. In a vehicular brake system having a brake element reciprocable for brake application and release, a spring adapted to move the element for application, an opposing power motor adapted to reenergize the spring and to release the brakes, a variably positionable pedal arranged to control the power at its normal low position, and to apply the brakes as substitute for the spring and power combination at its long-stroke position, the interconnections between the several parts being arranged that the motor upon reenergization of the spring concurrently positions the pedal to its normal low position of brake release.

7. In a vehicle brake system, a brake operator comprising, stored energy means adapted to apply the brakes, power means to normally release the brakes and restore the energy and, a driver-operable actuator arranged to control the power and energy means combination, the interconnections between the parts arranged so that an overnormal return movement of said actuator releases the brakes upon operative releasing failure of the power means.

8. In a brake system, a brake element resistantly movable for brake application, a power actuator to move the element, a driver-operable actuator arranged to control the power actuator, and interconnections including an intermediate floating lever having differential connections at three points respectively with the element and the two actuators, relatively and cooperatively so arranged that the operative movement of each actuator is directed to move the element towards brake application and that the power actuator retracts the other actuator when not driver-operated, instead of applying the brakes.

9. In a brake system having an element reciprocable for brake application and release, a brake operator comprising, reciprocably operable power actuator means, pedal means arranged for relatively light resistance to reciprocation, and force directing intermediate means whereby the power means is adapted to solely reciprocate the pedal, and upon the effectual foot resistance to the pedal's reciprocation to alternatively reciprocate the element for brake operation.

10. In a vehicle propelled by an internal combustion engine and having brakes, a brake operator comprising, a spring device to apply the brakes, a fluid power motor adapted to oppose the spring and release the brakes, a valve for the motor variably operable for variable braking, a brake pedal, duct connection between the valve and the intake manifold of the engine for vacuum force supply to the motor, interconnecting means between said pedal and the device and motor combination, whereby force from the pedal opposedly shunts the force from the device to apply the brakes, connection from said pedal and interconnecting combination to operate the valve upon pedal depression, and checking means adapted to restrain brake release directional movement of the spring device urged by predominance of force from the pedal.

11. In a brake system, a brake operator comprising, a power actuator adapted to apply the brakes, a driver-operable controller, mutually reactive connections between the actuator and controller to differentially direct brake applying force, and a frictional reverse movement checking device for the actuator comprising, a substantially V-grooved element, a coacting member adapted to effectually wedge therein, and structure whereby the line of force to be checked is directionally disposed relative to said element and member combination so that increase of said force increases the wedging pressure, said device preventing brake release movement of the actuator permitting surplus force from the controller to supplementally apply the brakes.

12. In a brake system, a brake operator comprising, a power actuator adapted to apply the brakes, a pedal, mutually reactive connections between the pedal and actuator, and a frictional reverse movement checking device for the actuator comprising, a substantially V-grooved element, a member adapted to coactively rotate upon actuator movement, which member has a rotation-concentric wedge structure for wedging in the V-groove of the element, the rotation urging brake applying force of the actuator connecting on said member directionally so that reversal of the force acts to effect lock wedging, said device preventing brake release movement of the actuator urged by predominance of force from the pedal.

13. In a vehicle brake system, a brake element movable for brake application, spring means arranged to move the element, a driver-operable brake pedal, mechanical interconnections between the pedal, element and means whereby depression of the pedal mutually reacts with the spring means to complementarily move the element, and a reverse movement checking device adapted to stop reverse movement of the means urged by predominance of pedal depression force, permitting such force to supplement for further braking.

14. In a vehicle brake system, a brake operator comprising a power actuator adapted to apply the brakes, a brake pedal mutually reactionally associated therewith and arranged to variably control the actuator for variable effective braking, and checking means adapted to restrain the actuator against yielding to predominant force from the pedal.

15. In a brake system, a brake element movable for brake application, power means to move the element, power dispensing control means, a brake pedal depressible to operate the control means, interconnections between the pedal, power means and element operable upon brake application, and further connection between said interconnections and control means so disposed that brake applying movement of the interconnections urges checking of the power for brake application and that further depression of the pedal opposedly urges further power flow for brake application.

16. In a vehicle brake system, a brake operator comprising, power means to apply, vary and release the brakes, power dispensive variable control means therefor, a manually operable controller, mutually reactive interconnections for the power means and controller including a resilient element whereby the power means opposes the brake applying force from the controller through the element, and further connection from said interconnections at a point on the power means side of the said element to said control means, thereby effecting power control graduation determined by the force from the controller as registered by the resilient element.

17. In a vehicle, a brake operator comprising, spring means to apply the brakes, power motor means adapted to reenergize the spring and release the brakes normally, a variable power dispensive control means therefor reversely operable for reverse power effects, a brake pedal, mutually reactive interconnections between the pedal and spring means including an additional spring arranged for yielding responsive to the opposing reactive forces, and connection from said interconnections at a point on the power means' functional side of the said additional spring to said control means, thereby effecting power variation according to predominance of force from the pedal or the spring means.

18. In a vehicle having brakes, a brake operator comprising power means adapted to apply the brakes, power dispensing means therefor, a pedal, an interconnection whereby the power brake applying force is registered against the pedal, which interconnection includes a force-responsively variably resilient means, and further connection whereby the yield of the last means acts to variably control the dispensing means, for graduated brake application.

19. In a brake system, a brake element operable for brake application, power means to operate the element, a brake pedal adapted also to operate the element, mutually reactive interconnections whereby forces from the pedal and power means are adapted for mutual shunting to complementarily operate the element, and retarding means arranged to moderate the movement of the pedal to favor power means operation of the element.

20. In a brake system, a brake element movable for brake application, power means to move the element, a driver-operable controller also to move the element, differential interconnections whereby the power means and controller opposedly mutually react to cumulatively move the element, and a trapped liquid dash-pot device adapted to retard the movement of the controller to favor power means operative progress towards applying the brakes.

21. In a vehicle, having a brake system of the conventional-like hydraulic type, a brake element movable for brake application, power means to move the element, a pedal also to move the element, differential interconnections whereby the pedal and means mutually react to cumulatively move the element, and a trapped liquid device adapted to retard movement of the pedal comprising high and low pressure chambers with choked communication therebetween, and a connection from the low-pressure chamber to the hydraulic system for liquid supply to the device.

22. In a vehicle propelled by an internal combustion engine and having brakes, a brake element movable for brake application, spring means to move the element, power motor means adapted to reenergize the spring, a normally low-positioned brake pedal adapted to control the spring and motor combination, interconnections between the pedal and the said combination whereby the pedal is conditioned for a subsequent long stroke upon failure of spring reenergization, an accelerator pedal to control the engine, operative connection between the last pedal and engine including an effectual connection dissociation device, and connections cooperatively associating said device with the aforesaid spring and motor combination so as to render the accelerator pedal ineffective by the brake applying movement of the spring means, said ineffectiveness accordingly remaining during failure of the motor means, as driver indication of the failure.

23. In a vehicle propelled by an internal combustion engine and having brakes, stored energy means adapted to operate the brakes, power motor means adapted to restore the energy, a source of power for the motor means, an accelerator pedal to control the engine, normally operative connections between the pedal and engine, and means cooperatively associating said connections with the power means and source combination so that the operative failure of the combination renders the pedal effectually inoperative to control the engine.

24. In a vehicle brake system, in combination, power means to apply the brakes, a brake pedal having a foot pad, and mutually reactive interconnections between the pedal and means whereby they differentially apply the brakes, which combination further comprises resilient means functionally between the foot pad and power means.

25. In a vehicular brake system, an element movable for brake application, a primary hydraulic pump to supply liquid to move the element, power means of substantial pressure braking force adapted to actuate the pump, a pedal adapted variably to control the power means for variable effective braking, and a secondary hydraulic pump connected for actuation by the pedal, both pumps being mutually differentially interconnected tending to supply liquid cumulatively to move the element.

26. In a vehicular brake system, a brake element movable for brake application, a primary hydraulic pump to supply liquid to move and exert substantial braking pressure on the element, spring means to actuate the pump, power motor means adapted to reenergize the spring means, power dispensive control means, a pedal connected to operate the control means, a secondary hydraulic pump connected for actuation by the pedal, both pumps being mutually reactively interconnected hydraulically to supply liquid cumulatively to move the element, and a reverse flow checking means adapted to oppose back-flow of liquid to the primary pump during at least the higher pressure braking application.

27. In a vehicle having a hydraulic flow distribution system to its several resistant wheel brakes, a primary pump, power means adapted to actuate the pump, a secondary pump, a pedal connected to actuate the secondary pump, and differential interconnections associating the pumps with the distribution system whereby operation of the primary pump over-retracts the pedal, whereas foot resistance on the pedal shunts the liquid to operate the brakes.

28. In a vehicle having a hydraulic flow distribution system to its several wheel brakes, a primary pump, a spring adapted to actuate the pump, power motor means adapted to reenergize the spring and release the pump, a secondary pump, a brake pedal connected to actuate the secondary pump, connection from the pedal to control the motor means thereby controlling the spring's pump actuation, and hydraulic interconnections between the pumps and said distribution system, whereby the primary pump causes liquid flow to press into the secondary pump and concurrently into the distribution system, the secondary pump and pedal combination being arranged for relatively least resistance and for consequent retraction, the added foot resistance on the pedal accordingly shunting the liquid flow into the distribution system for effective brake application.

29. In a vehicle having hydraulic flow ducts to its several wheel brakes, a primary pump, power means adapted to actuate the pump, a secondary pump, a pedal adapted to actuate the secondary pump, liquid flow interconnections between the pumps and the ducts whereby each pump is adapted to cumulatively contribute its flow to the ducts, and a back-flow checking device for the primary pump comprising, a hydraulic valve to check the back-flow, an actuator for the valve comprising, a hydraulic pressure responsively movable piston having a face exposed to the primary pump pressure, and resilient means of predetermined tension adapted to urge the piston against said pressure, said resilient means predominating over predeterminedly reduced pressure to open said valve for back-flow, and structure adapted to permit liquid of superior pressure to by-pass the valve for brake application.

30. In a vehicle having hydraulic flow ducts to its several wheel brakes, a primary pump, power means adapted to actuate the pump for brake applying liquid flow, a secondary pump, a pedal connected to actuate the secondary pump, connections between the pumps and ducts whereby each pump contributes its flow for brake application, and pedal movement retarding means adapted to favor brake actuation by the primary pump, which last means comprises a liquid flow obstruction adapted for movement upon the pedal depression to obstruct partially the liquid flow from the secondary pump.

31. In a vehicle having brakes of the hydraulic type, a primary pump for liquid flow to apply the brakes, power means of substantial pressure braking force adapted to actuate the pump, a secondary pump, a brake pedal connected to actuate the secondary pump, power dispensing means, and connection from the pedal to operate the dispensing means, each pump arranged to contribute substantial effective braking pressure flow to operate the brakes.

32. In a vehicle having brakes, a brake operator comprising, spring means adapted to apply the brakes, fluid power motor means adapted to energize the spring means and release the brakes, a control valve for the motor means, a pedal connected variably to control the valve for variable pressure breaking, and additional connecting structure between the pedal and the spring means, motor means and operated brake combination adapted to register the braking pressure reaction against the pedal.

33. In a brake system, power means to release the brakes, a normally short-stroked controller for the means, and means cooperatively associated with said power means and controller combination and arranged so that an overnormal retraction movement of the controller releases the brakes upon operative failure of the power means.

34. In a vehicular brake system, power means adapted to cause substantial effective braking, a normally short-stroked and correspondingly low-positioned driver-operated pedal for the means, and means cooperatively associated with the power means and pedal combination so that the pedal is adapted with a suitably longer stroke to effect the braking as substitute for the power means.

35. In a vehicular brake system, limited power means adapted to apply the brakes, a driver-operated controller adapted to variably control the means for variable effective braking and further arranged to cause supplemental pressure braking, and means whereby the instant operative position of the power means is substantially retained during the supplemental braking by the controller.

36. In a vehicular brake system, a primary hydraulic pump to effect braking, power means adapted to actuate the pump, a pedal adapted to control the power means, a secondary hydraulic pump connected for actuation by the pedal, both pumps communicating to contribute hydraulic flow for brake operation, and pedal movement retarding means adapted to favor brake actuation by the primary pump.

37. In a vehicle brake system, power means to operate the brakes, a normally short-stroked pedal adapted normally to control the means, means whereby the pedal is adapted with a suitably longer stroke to operate the brakes upon failure of the power means, and substantial force ratio changing means operative upon the said long-stroked movement of the pedal and adapted to give the driver's foot larger pressure advantage for braking at the pedal-depressed effective braking pressure range of pedal movement.

38. In a vehicular brake system, power means adapted to cause substantial effective braking, a normally short-stroked driver-operated controller for the same, associated means constructed so that the controller is adapted with a suitably longer stroke to effect the braking as substitute for the power means, and separate cooperatively associated means arranged to give prenotice to the driver of said longer stroke requirement condition.

39. In a vehicle having a hydraulic braking system, a brake member to be retarded in its movement, and a hydraulic dash-pot arranged to retard the member comprising a high-pressure dash-potting chamber, a low-pressure reservoir communicating therewith, and communication means between the low-pressure chamber and the hydraulic brake system to supply the chamber.

40. In a vehicle having hydraulic brakes, a pump for hydraulically operating the brakes, a pedal arranged to control the operation of the pump, a second hydraulic pump associated with the pedal for actuation thereby after a lost-motion so as to be inoperative during the normal depression stroke of the pedal but operative upon over-normal depression of the pedal, and a hydraulic duct connection between the second pump and the hydraulic brakes to supply additional liquid to the brakes upon over-depression of the pedal.

BERNARD HY. MOSSINGHOFF.